March 22, 1966 C. S. RUTHERFORD 3,242,311
WELDING CABLE SUSPENSION DEVICE
Filed Nov. 29, 1963
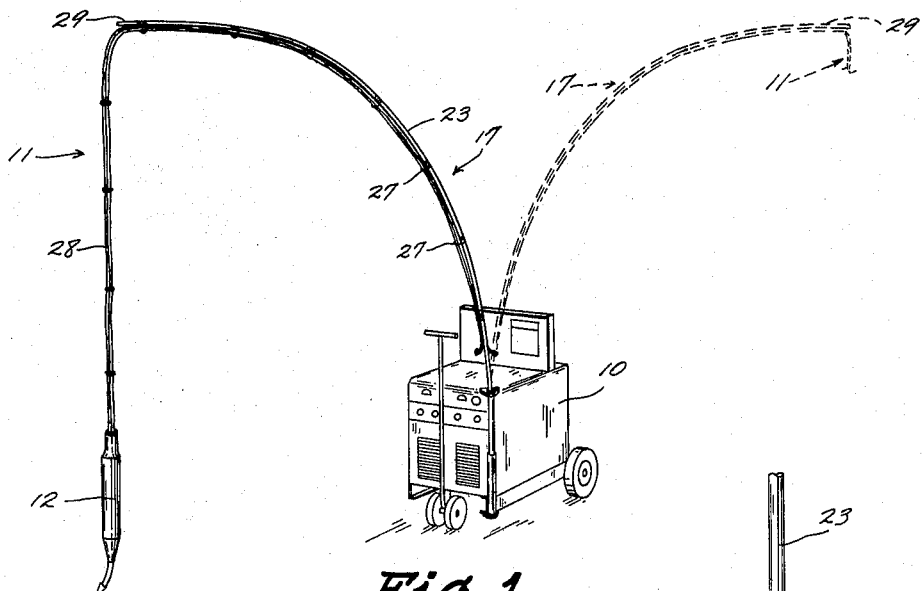
Fig. 1
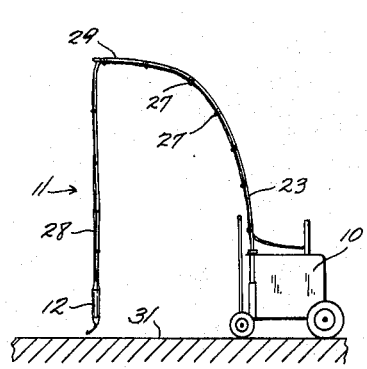
Fig. 2
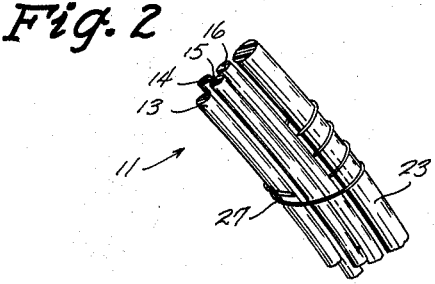
Fig. 4
Fig. 5
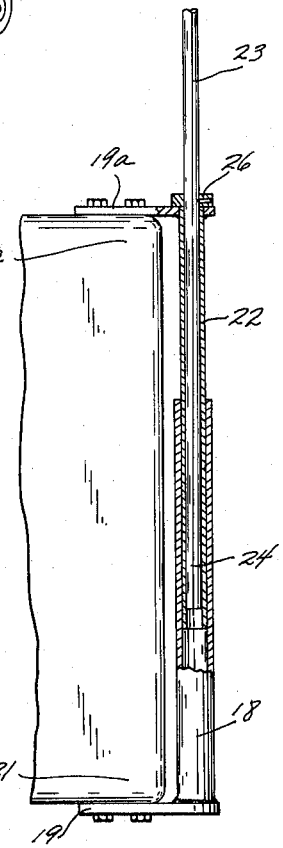
Fig. 3
INVENTOR
CLEON S. RUTHERFORD
BY
R. Robert Henderson
ATTORNEY

United States Patent Office 3,242,311
Patented Mar. 22, 1966

3,242,311
WELDING CABLE SUSPENSION DEVICE
Cleon S. Rutherford, 4220 Ingersoll, Des Moines, Iowa
Filed Nov. 29, 1963, Ser. No. 327,031
1 Claim. (Cl. 219—130)

This invention relates to an attachment to a welding apparatus of commercial manufacture, and is particularly concerned with suspending one or more cables emanating from the apparatus in a most advantageous position.

In many types of welding apparatus, and in particular with respect to an apparatus utilizing a wire drive mechanism, it has been found that the torque required to drive the wire through its cable is considerably high when the cable remains coiled on the floor of the welding shop, with a rise required up to the operator level. It has also been ascertained that a majority of the replacements of the cables are a direct result of injury to the cables by sharp bends which occur during normal use.

It is therefore an object of this invention to provide a novel device for suspending welding cables.

It is another object of this invention to provide a novel device for suspending one or more welding cables above a floor surface, and with an operating end of the cables at the operator's working height.

It is yet another object of this invention to provide a welding cable device for suspending one or more welding cables including a wire drive conduit in a gentle curve from their connection with the wire drive mechanism to the operating end.

Still another object of this invention is to provide a device for suspending a wire drive welding cable so as to minimize the torque required to drive the wire therethrough, and for minimizing the occurrence of sharp bends in the cable during use.

Yet another object of this invention is to provide a device for suspending a wire drive welding cable in a gradual curve above the floor with the torch at the operator's end suspended weightless above the floor, whereby the operator can move the torch about without lifting it.

It is another object of this invention to provide a welding cable suspension device capable of attaining the above designated objectives which is extremely economical to manufacture, rugged in service, and effective in use.

These objects, and other features and advantages of this invention will become readily apparent from the following description and the accompanying drawings, wherein:

FIG. 1 is a perspective view of the welding cable suspension device of this invention in assembled relation with a conventional power apparatus, showing a rotated position by the use of dotted lines;

FIG. 2 is a reduced, side elevational view of the assembly of FIG. 1;

FIG. 3 is an enlarged, fragmentary elevational view of the supporting structure, certain parts shown in section and others broken away for clarity of illustration;

FIG. 4 is a fragmentary view of a detail of the supporting structure; and

FIG. 5 is a fragmentary view of a portion of a flexible member, welding cables, and a clamp for connecting the cables to the member.

Referring now to the drawings, a commercially available portable Mig welding power source is shown at 10 in FIG. 1. Emanating from the power source 10 is a hose assembly indicated generally at 11 (see FIG. 5) and terminating in a torch 12.

In the particular embodiment shown herein, a fifteen foot cable and hose assembly is depicted, and which includes four conduits 13, 14, 15 and 16. Conduit 13 comprises a wire feed, the drive mechanism being an integral part of the power source 10. Conduit 14 comprises a gas feed, and conduit 15 includes a pair of electrical wires. Conduit 16 provides a supply and return of water to and from the torch 12.

To suspend the cable and hose assembly 11 in a graceful and gradual curve from the power source 10, as best illustrated in FIGS. 1 and 2, a suspension device indicated generally at 17 in FIG. 1 is provided. Referring to FIG. 3, the device 17 includes a socket tube 18 secured at its bottom end by a bracket 19 to one corner 21 of the power source, and disposed in an upstanding manner.

Telescopically inserted into the socket tube 18 is a smaller tube 22 to which is secured another bracket 19a. The bracket 19a is mounted on the power source 10 at an upper corner 21a. It will be noted that by this structure, the tubes 18 and 22 can be mounted to substantially any structure so long as the tubes remain telescopically connected. A fifteen foot flexible member 23 has one end 24 (FIG. 3) inserted in a vertical disposition in the smaller tube 22 and held in a vertically adjusted position therein by a swivel bearing unit 26. The remainer of the flexible member 23 is disposed in a curved manner laterally of the power source 10 and may be swiveled to any position relative thereto, as indicated by the dotted line position of FIG. 1.

A plurality of spirally wound, spring clips 27 (FIGS. 2 and 5) connect the conduits 13–16 to the flexible member 23 wherby the conduits are held in a parallel, contiguous position relative to the member 23. By this arrangement, the outer portion 28 (FIGS. 1 and 2) of the conduits depends from the outer, substantially horizontally disposed end 29 of the flexible member 23, with the torch 12 disposed above the floor surface 31 (FIG. 2) and within easy reach of the welding operator.

It may readily be seen that the suspension device 17 maintains the cable and hose assembly 11 off the floor with the conduits held in a gradual arc substantially on the periphery of an imaginary circle (see FIG. 2) and with the torch 12 held off the floor. Furthermore, the flexible member 23 is vertically adjustable and easily swiveled for ready placement of the torch 12.

Although a preferred embodiment of the invention has been disclosed and described herein, it is to be remembered that alternate constructions and modifications can be made without departing from the true spirit and scope of the invention, as defined in the appended claim.

I claim:

In a Mig welding apparatus including a wire drive mechanism, at least one conduit attached at one end to said mechanism, and a torch connected to the other end of the conduit, a suspension device comprising in combination:

a first tubular member secured in an upstanding position to the mechanism;

a second tubular member telescopically inserted into said first member and adjustably secured thereto;

a flexible member one end of which is inserted into said second member, the other end disposed in a substantially horizontal position laterally of the mechanism, the entire flexible member curved so as to lie on the circumference of an imaginary circle; and a plurality of coiled, spirally wound, spring clamps connecting the conduit to said member in a parallel, contiguous relationship, with the torch end of the conduit depending from the other end of said member.

References Cited by the Examiner

UNITED STATES PATENTS

| | | | |
|---|---|---|---|
| 1,853,609 | 4/1932 | Goodspeed | 219—125 |
| 2,402,937 | 6/1946 | Stringham | 219—130 |
| 2,445,863 | 7/1948 | Sarazin | 219—130 |
| 2,474,075 | 6/1949 | Talley | 219—130 |
| 2,748,236 | 5/1956 | Landis et al. | 219—130 |

FOREIGN PATENTS 585,327  2/1947  Great Britain.

RICHARD M. WOOD, *Primary Examiner.*